United States Patent
Okada et al.

(10) Patent No.: US 9,360,396 B2
(45) Date of Patent: Jun. 7, 2016

(54) TIRE UNIFORMITY TESTING DEVICE AND TIRE UNIFORMITY TESTING METHOD

(75) Inventors: Toru Okada, Hyogo (JP); Masao Murakami, Hyogo (JP); Yoshiaki Matsubara, Hyogo (JP); Shinichirou Ikai, Hyogo (JP)

(73) Assignee: Kobe Steel, Ltd., Hyogo (JP)

( * ) Notice: Subject to any disclaimer, the term of this patent is extended or adjusted under 35 U.S.C. 154(b) by 209 days.

(21) Appl. No.: 14/349,989

(22) PCT Filed: Jun. 22, 2012

(86) PCT No.: PCT/JP2012/065939
§ 371 (c)(1),
(2), (4) Date: Apr. 4, 2014

(87) PCT Pub. No.: WO2013/051310
PCT Pub. Date: Apr. 11, 2013

(65) Prior Publication Data
US 2014/0230535 A1    Aug. 21, 2014

(30) Foreign Application Priority Data

Oct. 6, 2011 (JP) ................................. 2011-222012
Oct. 6, 2011 (JP) ................................. 2011-222013

(51) Int. Cl.
*G01M 17/02* (2006.01)

(52) U.S. Cl.
CPC ............ *G01M 17/022* (2013.01); *G01M 17/02* (2013.01)

(58) Field of Classification Search
None
See application file for complete search history.

(56) References Cited

U.S. PATENT DOCUMENTS

| 4,702,287 A | 10/1987 | Higbie et al. | |
|---|---|---|---|
| 5,448,910 A * | 9/1995 | Yurjevich | G01M 17/022 73/146 |
| 6,584,877 B1 * | 7/2003 | Poling, Sr. | G01M 17/022 82/101 |
| 2003/0196483 A1 * | 10/2003 | Beebe | G01M 17/022 73/146 |
| 2007/0220964 A1 * | 9/2007 | Shinomoto | G01M 17/021 73/146 |
| 2009/0158834 A1 | 6/2009 | Seichter et al. | |
| 2012/0085158 A1 | 4/2012 | Murakami et al. | |
| 2015/0260613 A1 * | 9/2015 | Okada | G01M 17/024 702/56 |

FOREIGN PATENT DOCUMENTS

| CN | 1646891 A | 7/2005 |
|---|---|---|
| CN | 101389945 A | 3/2009 |
| JP | 02-223843 A | 9/1990 |

(Continued)

OTHER PUBLICATIONS

International Search Report; PCT/JP2012/065939; Sep. 25, 2012.
(Continued)

*Primary Examiner* — Andre Allen
(74) *Attorney, Agent, or Firm* — Studebaker & Brackett PC

(57) ABSTRACT

In a tire uniformity measurement, accurate tire uniformity is obtained from a measurement waveform immediately after a rotation of a tire is switched from a normal rotation direction to a reverse rotation direction. A tire uniformity testing device of the present invention includes a measurement unit 108 that obtains a force variation from a uniformity waveform corrected by a correction unit 109 that corrects the uniformity waveform so as to eliminate a shift gradient α existing in the uniformity waveform measured after a rotation of a tire T1 is reversed, and further includes an air-outflow regulation member 220 that regulates an from flowing into a tire T2 when a drum 205 retreats or advances.

9 Claims, 20 Drawing Sheets

(56) References Cited

FOREIGN PATENT DOCUMENTS

| | | | |
|---|---|---|---|
| JP | 02-259445 | A | 10/1990 |
| JP | 05-060640 | A | 3/1993 |
| JP | 06-265444 | A | 9/1994 |
| JP | 06-095057 | B2 | 11/1994 |
| JP | 09-257662 | A | 10/1997 |
| JP | 2006-047248 | A | 2/2006 |
| JP | 2009-527744 | A | 7/2009 |
| JP | 2010-204018 | A | 9/2010 |
| JP | 2011-002296 | A | 1/2011 |
| WO | 2007/095930 | A2 | 8/2007 |

OTHER PUBLICATIONS

Written Opinion of the International Searching Authority; PCT/JP2012/065939; Sep. 25, 2012.

* cited by examiner

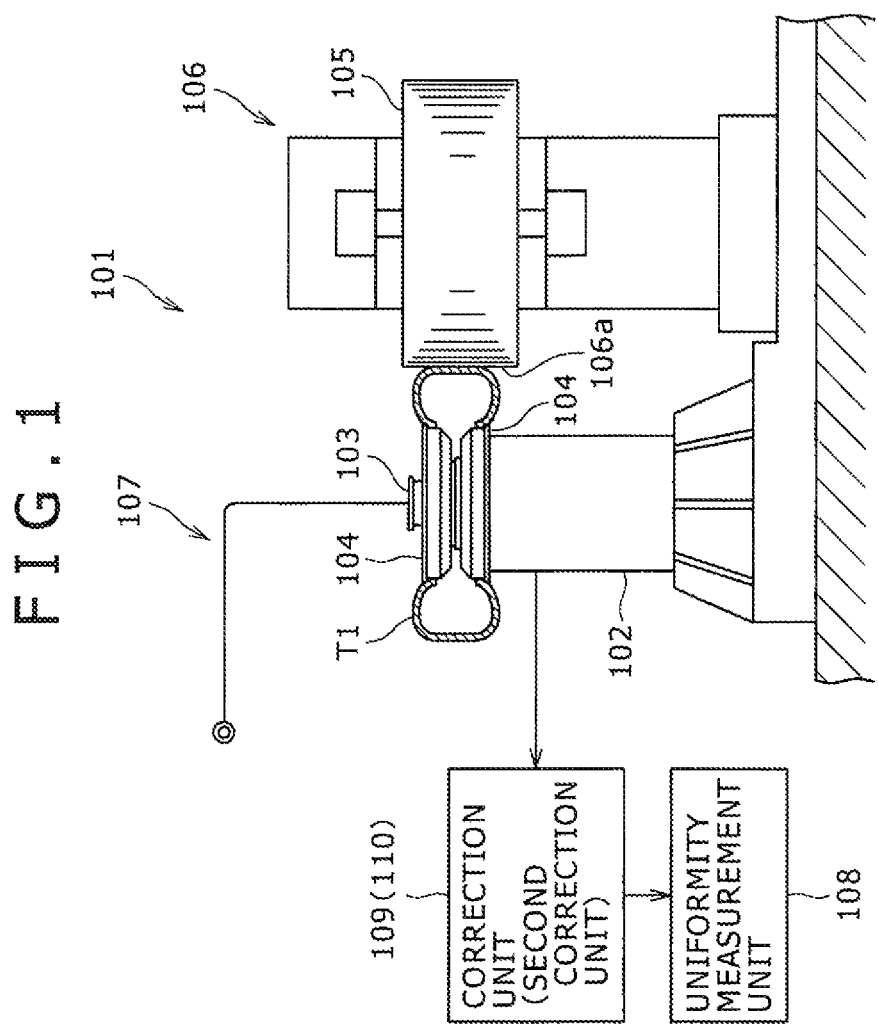

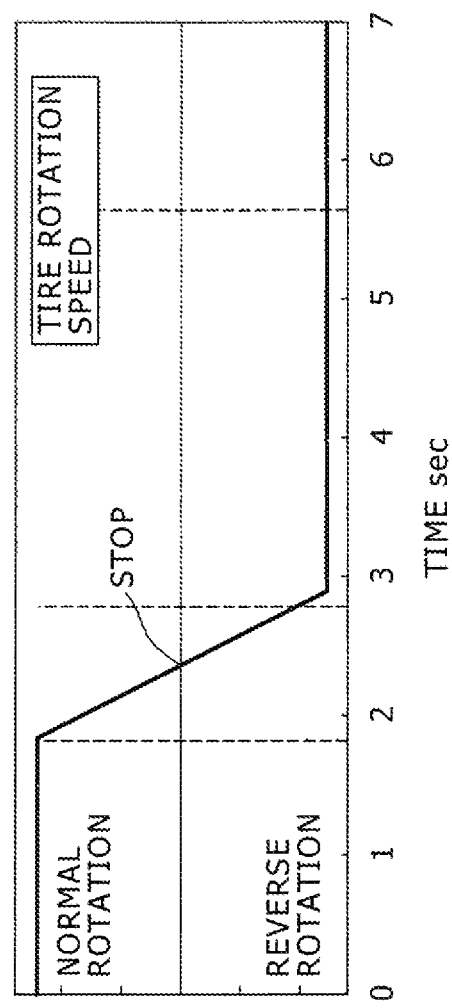

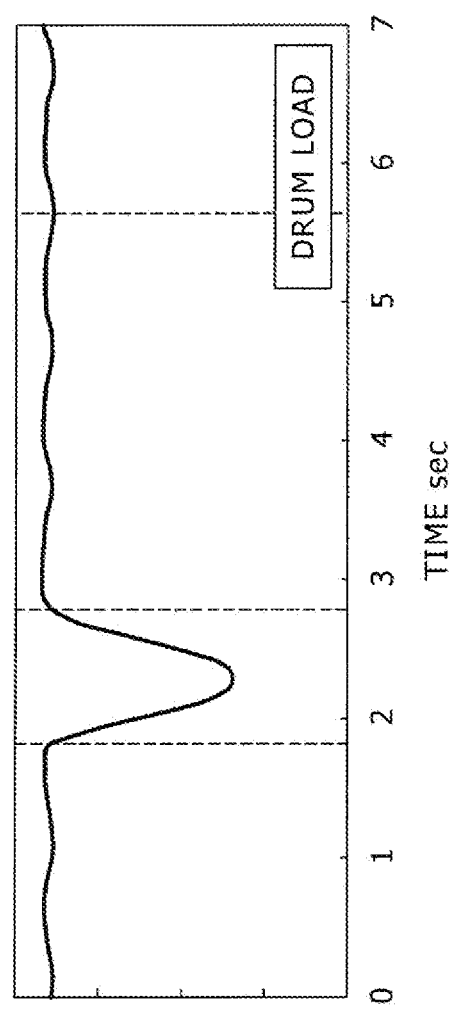

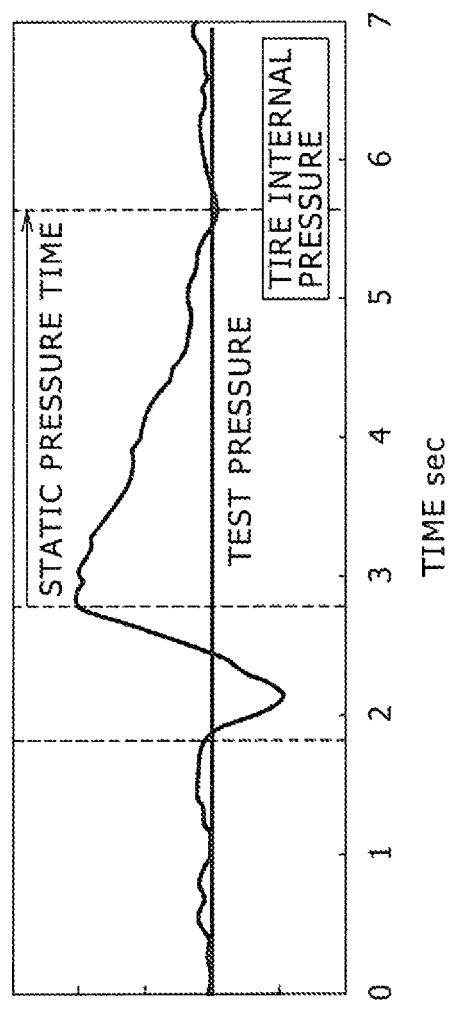

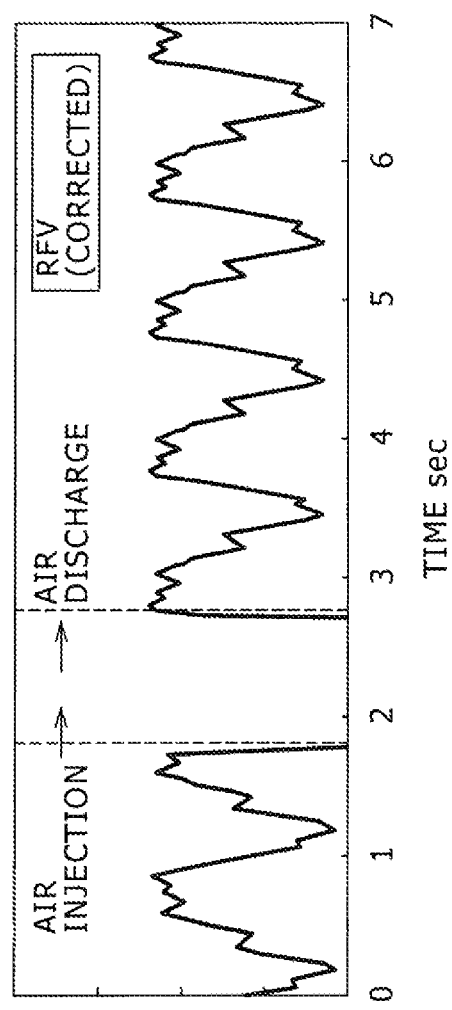

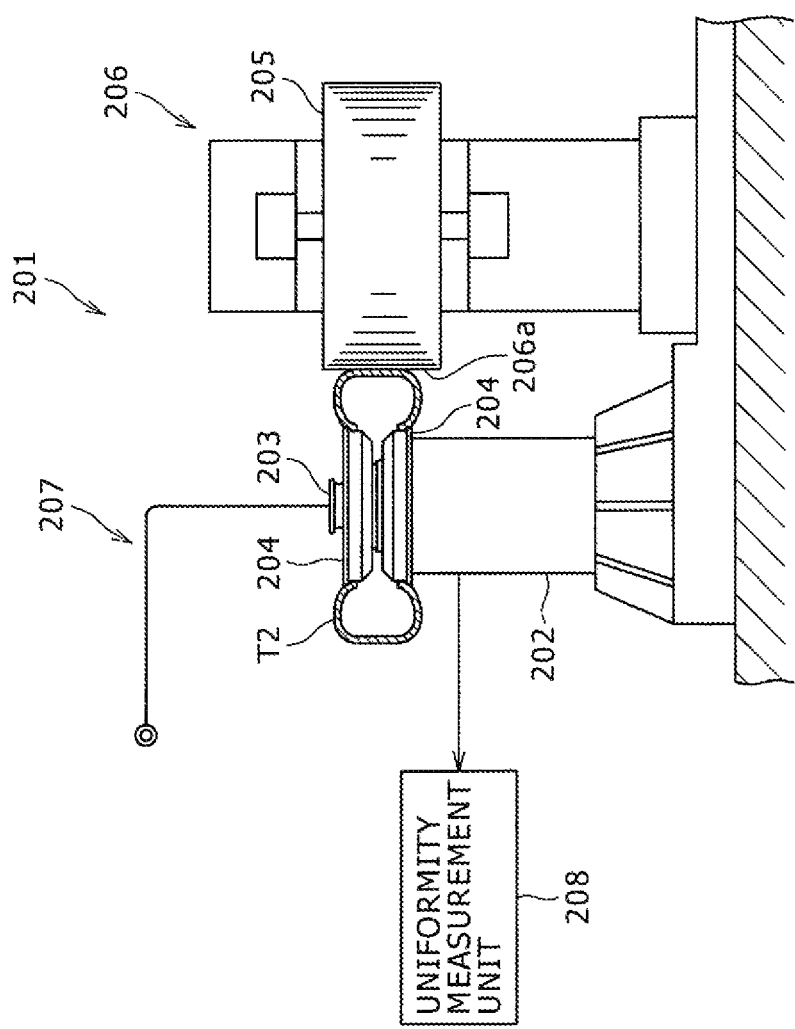

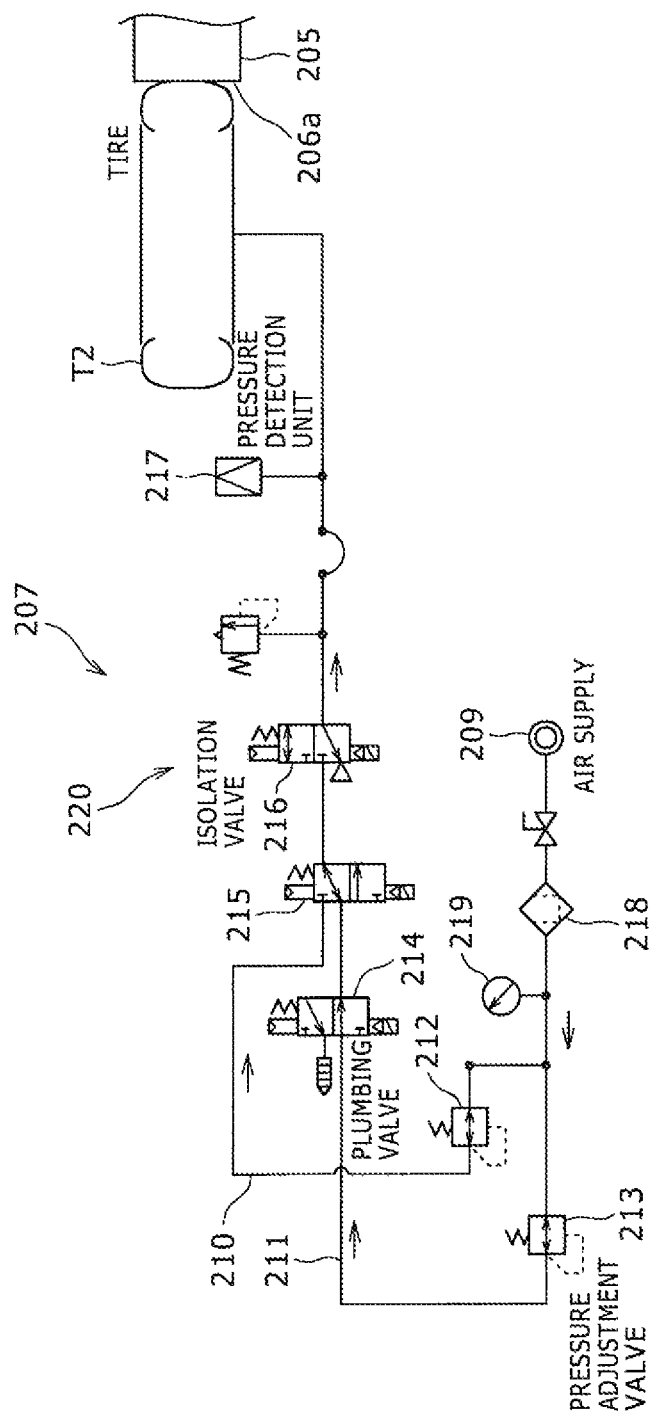

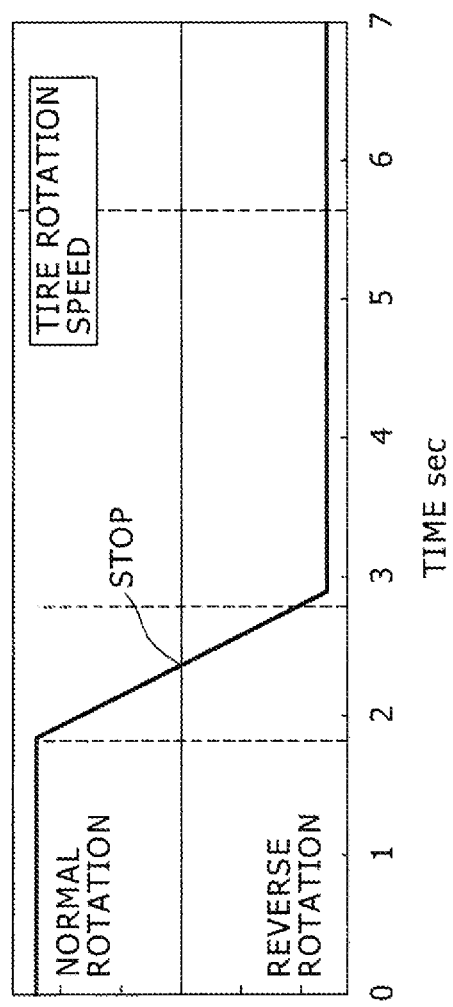

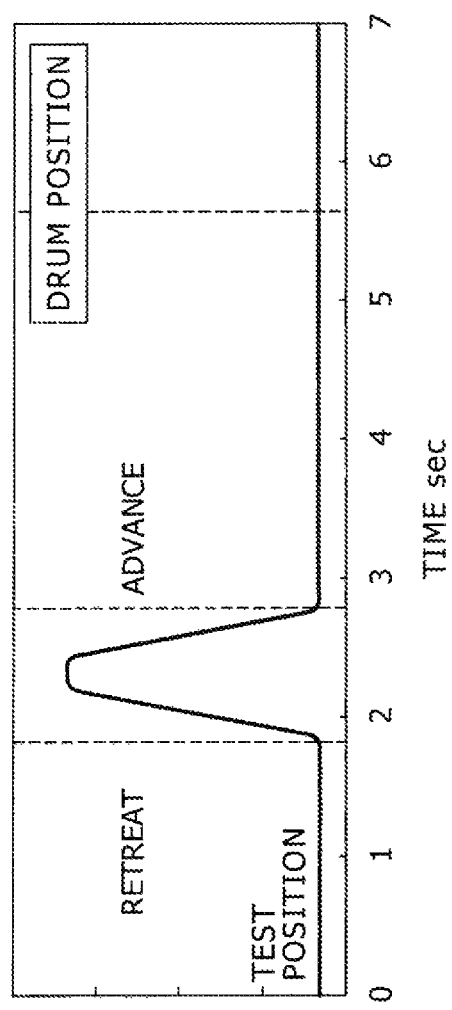

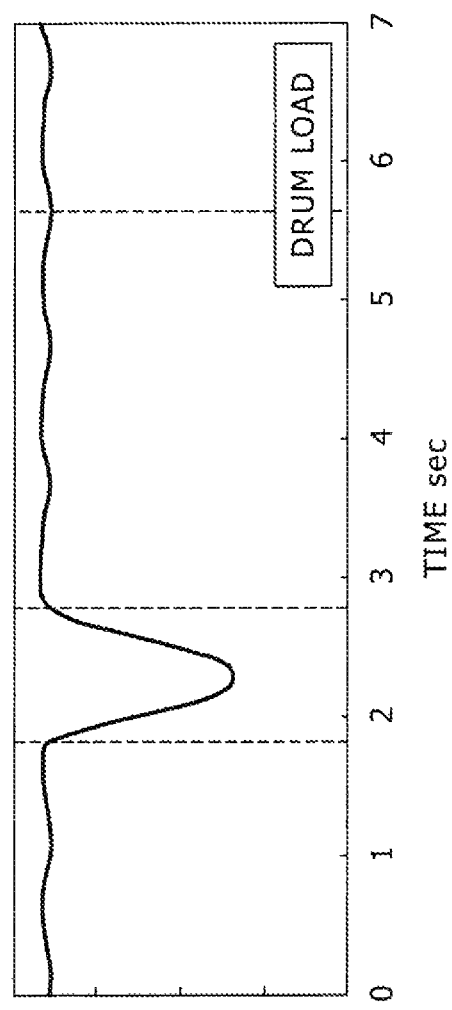

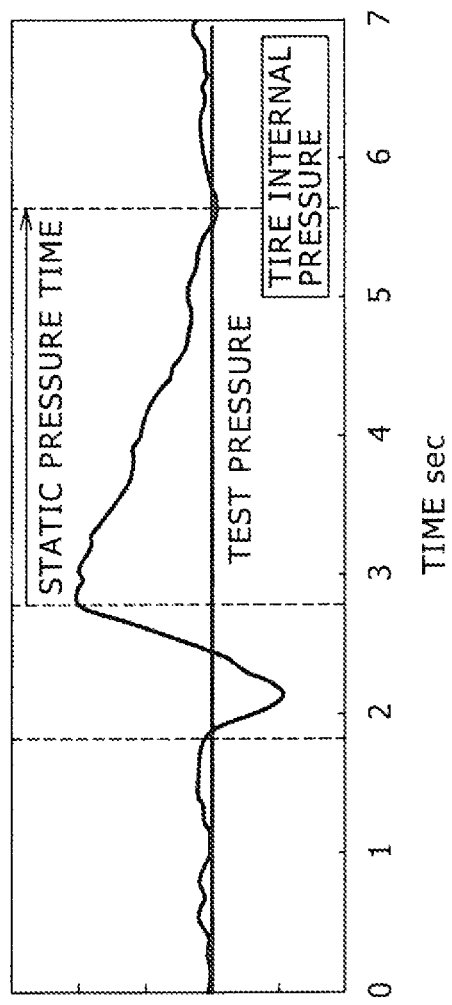

TIRE UNIFORMITY TESTING DEVICE AND TIRE UNIFORMITY TESTING METHOD

TECHNICAL FIELD

The present invention relates to a tire uniformity testing device that may measure the uniformity of a tire and a tire uniformity testing method that is performed by using the testing device.

Further, the present invention relates to a testing technology of a tire uniformity testing machine, and particularly, to a tire uniformity testing technology that may improve the measurement precision of a variation in force (Radial Force Variation: RFV) in the tire radial direction.

BACKGROUND ART

Hitherto, a uniformity inspection has been performed which measures the uniformity (evenness) of a product tire and determines whether the tire is good or bad. For example, when a case is exemplified in which the uniformity of an automobile tire is measured, a tire test is substantially performed according to the following procedure by using a tire testing device illustrated in Patent Document 1.

That is, in a case where the tire test is performed by the tire uniformity testing device of Patent Document 1, a tire that is conveyed from the upstream side of an inspection line is first clamped between upper and lower separate rims. Then, the tire is inflated in a short time by using a pipe of a bead seat system. Next, in the tire uniformity testing device, a compressed air passage is switched from the pipe of the bead seat system to a pipe of a test system by using a switch valve. Then, a drum is pressed against the tire maintained at a test pressure, the tire is rotated normally, and a repelling force generated in the tire is measured by using a load measurement unit provided in the drum, thereby measuring the uniformity of the tire. Subsequently, the tire is rotated reversely, and the uniformity of the tire is also measured during the reverse rotation.

Patent Document 2 discloses a tire testing device like Patent Document 1, but discloses a method of causing a contact surface of a load drum to retreat from a tire tread surface during the reverse rotation of the tire and reduces a pressure exerted on the tire during the stop of the tire.

Meanwhile, Patent Document 3 discloses a technology of obtaining a shift gradient of a force variation waveform caused by a warming-up characteristic for one revolution of a tire from a period of one revolution of the tire and a difference between a sampling value of a force variation waveform for one revolution of the tire and a sampling value for the subsequent revolution of the tire based on a result (waveform signal) obtained by a tire uniformity testing device, corrects the force variation waveform so that the gradient becomes 0, and obtains a force variation from the corrected force variation waveform.

Hitherto, a tire test (uniformity inspection) has been performed which measures the uniformity (evenness) of the product tire and determines whether the product tire is good or bad. For example, in a case where the uniformity of an automobile tire is measured, the tire test is substantially performed according to the following procedure by using a tire testing device disclosed in Patent Document 4.

That is, the tire testing device of Patent Document 4 includes an air pressure circuit that supplies compressed air supplied from a factory air supply to a tire placed on a rim while adjusting the pressure of the compressed air. Accordingly, the tire test is performed after the tire is inflated to a test pressure.

In a case where the tire test is performed by the tire testing device, the tire that is conveyed from the upstream side of an inspection line is clamped between upper and lower separate rims. Next, the tire is fixed to the rims while being inflated in a short time by using a pipe of a bead seat system as one of two branched pipes provided in the course of the air pressure circuit. Then, a drum is pressed against the tire that is maintained at the test pressure by the compressed air supplied from a pipe of a test system as the other pipe of two pipes, the tire is rotated normally, and the uniformity of the tire is measured. Subsequently, the tire is rotated reversely, and the uniformity of the tire is also measured during the reverse rotation.

In the above-described tire uniformity measurement method, when the rotation direction of the load drum is reversed from the state where the load drum rotates in a predetermined rotation direction, the rotation of the load drum temporarily stops. If the rotation of the tire stops while a predetermined pressure is applied to the tire, a recessed portion of the tire caused by the pressure of the load drum becomes a remaining recessed portion later (see FIG. 4). This phenomenon is caused by the viscoelastic characteristic of a rubber material of the tire. Then, it takes some time until the remaining recessed portion is restored to the original state, and according to Patent Document 4, it is proved that the measurement precision is largely influenced when the uniformity of the tire is measured in such a state. Thus, there is a need to measure the uniformity of the tire while the uniformity waveform is stabilized after a user waits for the restoration of the tire, and hence a problem arises in that some time is taken.

Therefore, as one of methods of solving the above-described problems, Patent Document 5 discloses a method of causing a contact surface of a load drum to retreat from a tire tread surface before a tire is rotated reversely and reduces a pressure exerted on the tire when the rotation of the tire stops.

CITATION LIST

Patent Document

Patent Document 1: JP H06-95057 B
Patent Document 2: JP H02-223843 A
Patent Document 3: JP H06-265444 A
Patent Document 4: JP H06-95057 B
Patent Document 5: JP H02-223843 A

SUMMARY OF THE INVENTION

Technical Problem

Incidentally, in a case where the uniformity of the tire is measured during the normal rotation or the reverse rotation of the tire by using the tire uniformity testing device disclosed in Patent Document 1, when the rotation direction of the load drum is reversed from the state where the load drum rotates in a predetermined rotation direction, the rotation of the load drum temporarily stops. When the rotation of the tire stops while a predetermined pressure is exerted on the tire, the recessed portion caused by the pressure of the load drum becomes the remaining recessed portion. The remaining recessed portion is caused by the viscoelastic characteristic of the rubber material of the tire.

As illustrated in FIG. 4, it takes some time until the remaining recessed portion is restored to the original state, and it is obvious that the uniformity measurement precision is largely influenced when the uniformity of the tire is measured in this state (see Patent Document 2). Therefore, there is a need to measure the uniformity of the tire while the uniformity waveform is stabilized after a user waits for the restoration of the tire, and hence a problem arises in that some time is taken.

As a method of solving this problem, according to Patent Document 2, the contact surface of the load drum is caused to retreat from the tire tread surface when the rotation direction of the tire is reversed, and hence it is possible to reduce the pressure exerted on the tire when the rotation of the tire stops.

However, it is obvious that a new problem occurs when the technology of Patent Document 2 is employed.

That is, when the drum is caused to retreat after the test during the normal rotation ends, the recessed portion of the tire caused by the pressure of the load drum is eliminated, and hence the volume inside the tire increases. As a result, the pressure inside the tire decreases. Then, the compressed air is supplied into the tire so that the pressure inside the tire becomes a predetermined test pressure by the function of the air pressure circuit (particularly, the pressure adjustment valve) provided in the tire uniformity testing device.

Subsequently, the load drum is caused to advance to a predetermined position (the same position as that at the normal rotation) for the test during the reverse rotation. However, at this time, a recessed portion is formed again in the tire due to the pressure of the load drum, and hence the volume (inner volume) inside the tire decreases. Then, the tire internal pressure instantly increases due to a decrease in volume. Here, it takes some time until the tire internal pressure becomes stabilized at a predetermined test pressure by the pressure adjustment valve.

FIG. 3 illustrates a variation in tire internal pressure and a measured RFV (radial force variation) waveform at this time. As illustrated in this drawing, in a shift state where the test pressure is not stabilized, the RFV, that is, the tire uniformity waveform is also shifted on the graph in the vertical direction and not stabilized, and hence a correct force variation may not be obtained. At the step in which the value for obtaining a waveform amplitude value RFV0 is a positive value and the shift gradient exists in a region where the pressure is stabilized and the RFV waveform is stabilized (the step in which the graph is inclined as a whole), the value may be estimated as a large value like RFV1 or may be estimated as a small value like RFV2 due to the measurement timing.

Patent Document 3 discloses a method of correcting a force variation waveform so that a shift gradient becomes 0 on the assumption that the shift amount of the shift gradient of the force variation waveform for one revolution of the tire is constant. However, it is difficult to simply use the data shift that is caused by the advance or the retreat of the drum in that the shift amount for several numbers of rotations of the tire is not constant or limited. Also, a case may be considered in which the shift correction calculation based on Patent Document 3 may have a bad influence.

The present invention is made in view of the above-described problems, and an object thereof is to provide a tire uniformity testing device and a tire uniformity testing method capable of highly precisely obtaining accurate tire uniformity, and particularly, a variation in force (RFV) in the tire radial direction from a measurement waveform immediately after a rotation of a tire is reversed from a normal rotation during a tire uniformity measurement.

Meanwhile, in a case where the tire uniformity during the reverse rotation of the tire is measured by using the tire testing device disclosed in Patent Document 5, when the load drum is caused to retreat from the tire, the recessed portion of the tire caused by the pressure of the load drum is eliminated, and hence the volume (inner volume) inside the tire increases. As a result, the pressure inside the tire decreases. By the function of the pressure adjustment valve, the compressed air is supplied into the tire so that the tire internal pressure becomes the test pressure. After the revere rotation ends, the load drum is caused to advance to the same position as that at the normal rotation so as to apply a load to the tire. However, at this time, the recessed portion is formed again in the tire due to the pressure of the load drum, and hence the volume inside the tire decreases. When the volume decreases, the tire internal pressure increases instantly. Thus, it takes some time until the tire internal pressure is stabilized at a predetermined test pressure by the pressure adjustment valve. In a state where the tire internal pressure is not stabilized at the test pressure, the uniformity waveform is not also stabilized. Accordingly, it is obvious that the measurement time is not shortened with the simple operation of causing the load drum to retreat or advance.

The present invention is made in view of the above-described problems, and an object thereof is to provide a tire uniformity testing device and a tire uniformity testing method capable of highly precisely obtaining accurate tire uniformity and particularly, a variation in force (RFV) in the tire radial direction immediately after a rotation of a tire is reversed from a normal rotation during a tire uniformity measurement.

Means for Solving Problem

In order to attain the above-described objects, the present invention takes the following technical means.

That is, according to the present invention, there is provided a tire uniformity testing device including: a spindle shaft to which a tire is attachable; and a drum mechanism that rotatably supports a drum and presses the tire attached to the spindle shaft against an outer peripheral surface of the drum, wherein in a case where the drum mechanism reverses the rotation of the tire, the drum is caused to retreat while the contact state between the drum and the tire is maintained, the rotation direction of the tire is switched from the rotation in one direction to the rotation in the other direction, and the drum is caused to advance so that a load is applied to the tire, wherein tire uniformity testing device further includes: a correction unit that corrects a uniformity waveform so as to eliminate a shift gradient α existing in the uniformity waveform measured after the drum mechanism reverses the rotation of the tire; and a measurement unit that obtains a force variation from the uniformity waveform corrected by the correction unit.

Preferably the tire uniformity testing device may further include a second correction unit that is provided instead of the correction unit, and the second correction unit may be configured to store the uniformity waveform from the time earlier than the uniformity waveform measurement start time and to correct the uniformity waveform from the early time so as to eliminate a shift gradient α' obtained from the uniformity waveform from the early time.

Further, according to the present invention, there is provided a tire uniformity testing method of a tire uniformity testing device including a spindle shaft to which a tire is attachable and a drum mechanism that presses a rotatable drum against the outer periphery of the tire, wherein in a case where the drum mechanism reverses the rotation of the tire, the drum is caused to retreat while the contact state between the drum and the tire is maintained, the rotation direction of the tire is switched from the rotation in one direction to the rotation in the other direction, and the drum is caused to advance so that a load is applied to the tire, wherein a uniformity waveform is corrected so as to eliminate a shift gradient α existing in a uniformity waveform measured after the drum mechanism reverses the rotation of the tire, and wherein a force variation is obtained from the corrected uniformity waveform.

Preferably, the uniformity waveform may be stored from the time earlier than the uniformity waveform measurement start time, and the uniformity waveform may be corrected from the early time so as to eliminate a shift gradient α' obtained from the uniformity waveform at the early time instead of the correction of the uniformity waveform that eliminates the shift gradient α.

Further, according to the present invention, there is provided a tire uniformity testing device including: a drum mechanism that rotatably supports a drum and presses the drum against an outer peripheral surface of a tire attached to a spindle shaft; and an air pressure circuit that supplies compressed an to the tire, wherein in a case where the drum mechanism reverses the rotation of the tire, the drum is caused to retreat while the contact state between the drum and the tire is maintained, the rotation direction of the tire is switched from the rotation in one direction to the rotation in the other direction, and the drum is caused to advance so that a load is applied to the tire, and wherein the air pressure circuit includes an air-outflow regulation member that regulates the inflow of air into the tire when the drum mechanism causes the drum to retreat and cancels the regulation of the inflow of the air after the drum mechanism causes the drum to advance.

Preferably, the air pressure circuit may include an air supply that supplies the compressed air to the tire, a pressure detection unit that detects an air pressure exerted inside the tire, and a pressure adjustment valve that adjusts the pressure of the compressed air supplied from the air supply to a predetermined air pressure based on the air pressure detected by the pressure detection unit, and the air-outflow regulation member may include an isolation valve that is disposed between the pressure adjustment valve and the tire and interrupts the supply of the compressed air from the pressure adjustment valve to the tire.

Preferably, the air pressure circuit may include a plurality of branch pipes that are disposed in parallel between the air supply and the tire, and each branch pipe may be provided with the pressure adjustment valve and an isolation valve that interrupts the supply of the compressed air from the pressure adjustment valve to the tire.

Further, according to the present invention, there is provided a tire uniformity testing method that use a tire uniformity testing device including a drum mechanism that rotatably supports a drum and presses the drum against an outer peripheral surface of a tire attached to a spindle shaft and an air pressure circuit that supplies compressed air to the tire, wherein in a case where the drum mechanism reverses the rotation of the tire, the drum is caused to retreat while the contact state between the drum and the tire is maintained, the rotation direction of the tire is switched from the rotation in one direction to the rotation in the other direction, and the drum is caused to advance so that a load is applied to the tire, and wherein in a case where the rotation of the tire is reversed from the rotation in one direction to the rotation in the other direction, the inflow of the compressed air into the tire through the air pressure circuit is regulated as the drum retreats, and the regulation of the inflow of the compressed air into the tire is canceled after the drum advances.

Effect of the Invention

According to the tire uniformity testing device and the tire uniformity testing method of the present invention, it is possible to obtain the accurate tire uniformity from the measurement waveform immediately after the rotation direction of the tire is switched from the normal rotation direction to the reverse rotation direction during the tire uniformity measurement.

Further, according to the tire uniformity testing technology of the present invention, it is possible to highly precisely obtain the accurate tire uniformity, and particularly, the radial force variation (RFV) immediately after the rotation direction of the tire is switched from the normal rotation direction to the reverse rotation direction during the tire uniformity measurement.

BRIEF DESCRIPTION OF DRAWINGS

FIG. 1 is a front view illustrating a tire testing device according to the present invention.

FIG. 2A is a diagram illustrating a variation in tire rotation speed from a normal rotation to a reverse rotation of a tire.

FIG. 2C is a diagram illustrating a variation in drum load from a normal rotation to a reverse rotation of a tire.

FIG. 2E is a diagram illustrating a variation in tire internal pressure from a normal rotation to a reverse rotation of a tire.

FIG. 2F is a diagram illustrating a variation in (corrected) RFV waveform from a normal rotation to a reverse rotation of a tire.

FIG. 5 is a schematic diagram illustrating a tire uniformity testing device according to the present invention.

FIG. 6 is a diagram illustrating an air pressure circuit according to a third embodiment.

FIG. 7A is a diagram illustrating a variation in tire rotation speed from a normal rotation to a reverse rotation of a tire.

FIG. 7B is a diagram illustrating a variation in drum position from a normal rotation to a reverse rotation of a tire.

FIG. 7C is a diagram illustrating a variation in drum load from a normal rotation to a reverse rotation of a tire.

FIG. 7E is a diagram illustrating a variation in tire internal pressure from a normal rotation to a reverse rotation of a tire (in a case without the air-outflow regulation member).

DESCRIPTION OF EMBODIMENTS

[First Embodiment]

Figure 2B:
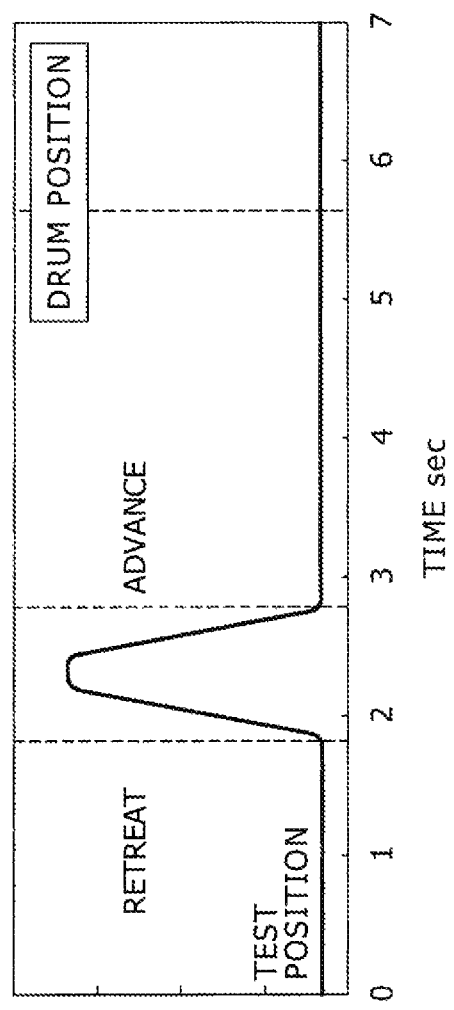
FIG. 2B is a diagram illustrating a variation in drum position from a normal rotation to a reverse rotation of a tire.

A first embodiment of a tire uniformity testing device and a tire uniformity testing method according to the present invention will be described with reference to the drawings.

As illustrated in FIG. 1, a tire uniformity testing device 101 of the first embodiment includes a cylindrical frame body 102 that is disposed so that the axis center thereof faces the vertical direction and a spindle shaft 103 that is attached into the frame body 102 so as to be rotatable about the vertical axis through a bearing portion. The spindle shaft 103 protrudes upward from the upper end of the frame body 102, and a pair of upper and lower rims 104 and 104 is provided at the upward protruding portion of the spindle shaft 103 so as to fix a tire T1. Further, a drum (load drum) 105 having a simulation road surface 106a formed on the outer peripheral surface thereof is provided beside the tire T1 fixed by the rims 104. The drum 105 is provided in a drum mechanism 106.

The drum mechanism 106 is adapted to support the drum 105 so that the drum may be driven and rotated about the vertical axis and to move horizontally so that the simulation road surface 106a contacts the tire T1. In a case where the drum mechanism 106 of this embodiment reverses the rotation of the tire T1, the drum 105 is caused to retreat while the contact state between the drum and the tire T1 is maintained, the rotation direction of the tire T1 is switched from the normal rotation direction (the rotation in one direction) to the reverse rotation direction (the rotation in the other direction), and the drum 105 is caused to advance so that a load is applied to the tire T1.

Further, there is a need to adjust the pressure of the tire T1 to a predetermined air pressure in order to perform a tire test. Therefore, an air pressure circuit 107, which adjusts the air pressure inside the tire T1 by supplying compressed an into the tire T1 or discharging compressed air from the tire T1, is disposed inside the tire uniformity testing device 101.

The air pressure circuit 107 includes two supply pipe systems. One supply pipe system is a pipe of a bead seat system that inflates the tire T1 in a short time and attaches the tire T1 to the rims 104, and the other supply pipe system is a pipe of a test system that is used to test the tire T1. The pipe of the bead seat system and the pipe of the test system may be switched by using a switch valve. Further, the air pressure circuit 107 is provided with a pressure adjustment valve that uniformly adjusts the pressure inside the tire T1.

Further, a load detector that is configured as a load cell is disposed in the bearing portion supporting the spindle shaft 103 is disposed in the tire uniformity testing device 101. A force component that is measured by a component force meter is transmitted as a signal of a uniformity waveform (hereinafter, referred to as a RFV waveform) to a uniformity measurement unit (measurement unit) 108. FIGS. 2A to 2F and FIGS. 3A and 3B illustrate an example of the signal of the RFV waveform.

In addition, in a case of this embodiment, a correction unit (first correction unit) 109 is provided which corrects the RFV waveform so as to eliminate a shift gradient α existing in the RFV waveform measured after the operation in which the drum mechanism 106 reverses the rotation direction of the tire T1.

The correction unit 109 will be described in detail below.

When the drum 105 is caused to retreat by the drum mechanism 106 after the test of the tire T1 during the normal rotation ends, the volume (inner volume) inside the tire T1 increases in order to eliminate the recessed portion of the tire T1 caused by the pressure using the drum 105. As a result, the pressure inside the tire T1 decreases. Then, compressed air is supplied into the tire T1 so as to set the pressure inside the tire T1 to a predetermined test pressure by the function of the air pressure circuit 107 (particularly the pressure adjustment valve) provided in the tire uniformity testing device 101. Subsequently, the drum 105 is caused to advance to a predetermined position (the same position as that at the normal rotation) for the reverse rotation test. However, at this time, a recessed portion is formed again in the tire T1 due to the pressure of the drum 105, so that the inner volume of the tire T1 decreases. As illustrated in FIGS. 2E and 3B, the internal pressure of the tire T1 instantly increases due to a decrease in volume.

Figure 2D:
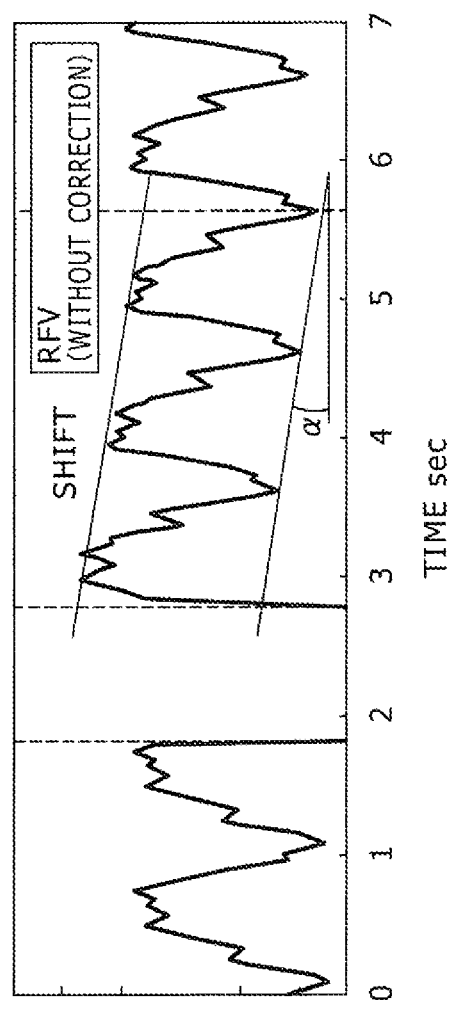
FIG. 2D is a diagram illustrating a variation in RFV waveform (without correction) from a normal rotation to a reverse rotation of a tire.
Figure 3A:
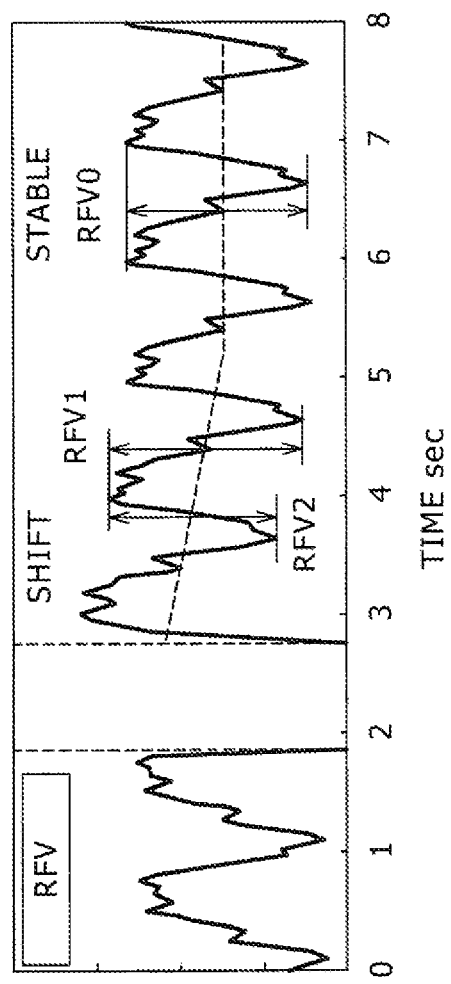
FIG. 3A is a diagram illustrating a variation in RFV waveform from a normal rotation to a reverse rotation of a tire in a tire testing device of the related art.
Figure 3B:
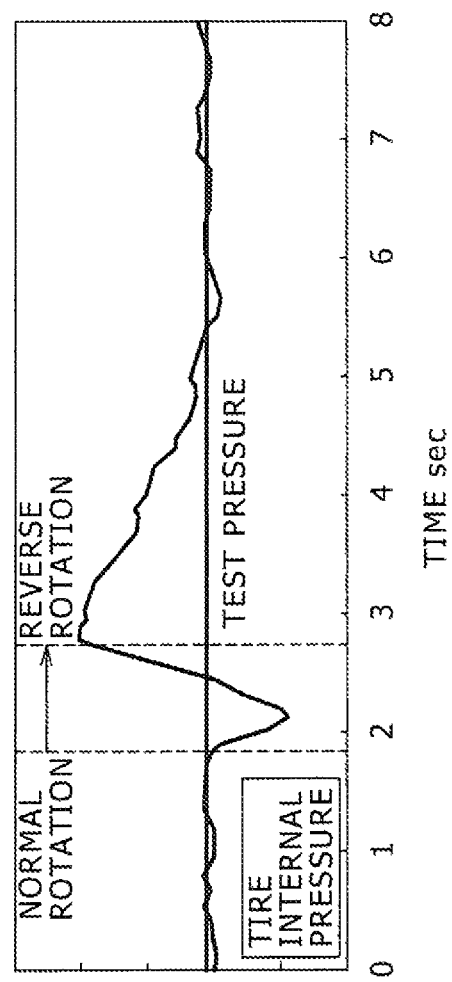
FIG. 3B is a diagram illustrating a variation in tire internal pressure from a normal rotation to a reverse rotation of a tire in the tire testing device of the related art.
Figure 4:
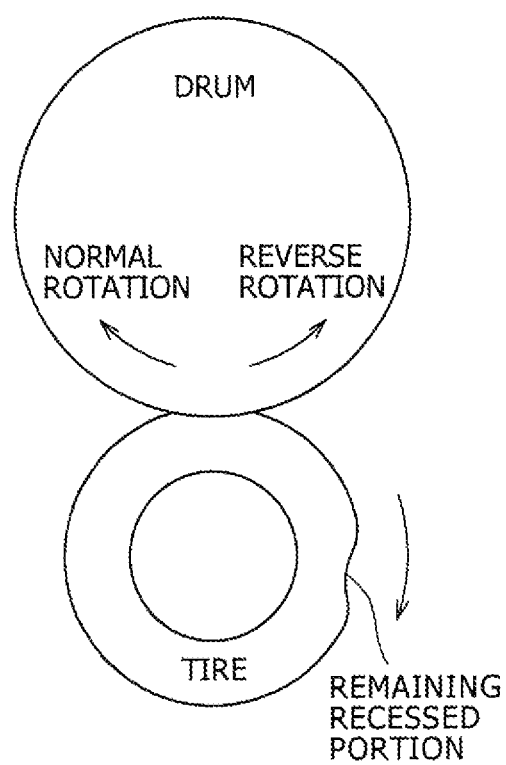
FIG. 4 is a schematic diagram illustrating a state where a tire is rotated reversely in the tire testing device of the related art.

FIGS. 2D and 3A illustrate the RFV waveform (the waveform of the measurement method of the related art) that is measured during the reverse rotation of the tire T1. As illustrated in this drawing, in a state where the pressure inside the tire T1 is not stabilized, the RFV waveform is not stabilized while being moved (shifted) in the vertical direction on the graph, and hence a correct force variation may not be obtained.

The correction unit 109 corrects the RFV waveform so as to eliminate the shift gradient α.

Each of the correction unit 109 and the uniformity measurement unit 108 includes a computer and the like.

Hereinafter, the operation of the correction unit 109 will be described with reference to the uniformity measurement procedure of the tire uniformity testing device 101.

First, in a case where the uniformity measurement is performed by the tire uniformity testing device 101, the tire T1 that is conveyed from the upstream side of the inspection line is first clamped between the upper and lower divided rims 104 and 104. Next, the tire T1 is inflated in a short time by using the pipe of the bead seat system of the air pressure circuit 107. At this time, the air pressure of the compressed an supplied to the tire T1 is generally set to a pressure (for example, about 0.4 MPa) higher than the test pressure during the test of the tire T1, and the tire T1 is maintained at the test pressure for about 1 second including a pressure increase time.

Next, in the tire uniformity testing device 101, the compressed air passage is switched from the pipe of the bead seat system to the pipe of the test system of the air pressure circuit 107 by using the switch valve. A pressure adjustment valve is provided in the course of the pipe of the test system, and the high-pressure compressed air may be decreased to the test pressure (for example, about 0.2 MPa) through a pressure control. Thus, the air pressure inside the tire T1 is adjusted to the test pressure by the compressed air supplied to the pipe of the test system. Then, the drum 105 is pressed against the tire T1 maintained at the test pressure and is "rotated normally", and the repelling force generated in the tire T1 is measured by using the load detector, thereby measuring the RFV waveform of the tire T1.

Next, the tire T1 is "rotated reversely", and the RFV waveform is measured.

First, the drum position starts to be retreat immediately before changing the rotation speed of the tire T1 during the normal rotation of the tire T1, and the drum 105 is caused to retreat with a decrease in rotation speed. The drum load decreases as the drum is caused to retreat. It is preferable to set the retreat amount of the drum 105 to the amount in which the drum load remains so that no slip occurs between the tire T1 and the drum 105. This is because the rotation of the drum 105 may be transmitted from the motor driven tire shaft to the drum 105 through the tire T1, and hence there is a possibility that the tire T1 may slip due to the inertia force generated when accelerating or decelerating the rotation of the drum if the contact pressure between the drum 105 and the tire T1 is small.

Subsequently, the drum positions is controlled so that the load of the drum 105 becomes minimal at the timing in which the rotation speed of the tire T1 becomes 0, that is, the rotation of the drum 105 stops. At this time, the tire T1 starts to be rotated reversely at the drum position, the drum 105 is caused to gradually advance when the tire T1 is accelerated in the reverse rotation direction, and the drum 105 is caused to reach a predetermined test position at the timing in which the rotation speed of the tire T1 becomes a predetermined test rotation speed. Further, the tire T1 is rotated reversely; and the uniformity waveform during the reverse rotation is measured.

FIGS. 2A to 2E illustrate a variation in tire rotation speed, a variation in drum position, a variation in drum load, a variation in RFV waveform, and a variation in tire internal pressure when the tire T1 is rotated reversely fro s the normal rotation direction. The RFV waveform of FIG. 2D is measured by the uniformity measurement unit.

As apparent from FIGS. 2A to 2E, when the drum is caused to retreat or advance during the reverse rotation of the tire T1, the tire internal pressure largely increases after the drum is caused to completely advance, and decreases linearly when the pressure is returned to the test pressure. In the meantime, the RFV waveform is also shifted at a certain gradient. Since the shift amount (shift gradient α) may be calculated from the measured RFV waveform, a correct RFV waveform may be obtained when the RFV waveform shift amount is corrected based on the obtained shift gradient α.

The RFV waveform correction may be performed as below by the correction unit 109.

First, as illustrated in FIG. 2D, the waveform for 1 second corresponding to one revolution of the tire T1 rotating at 60 rpm is generally sampled in the measurement of the RFV waveform. The data for 1 second is analyzed. When there are two RFV measurement data (point data) for 1 second, the shift gradient α may be calculated.

In the RFV waveform illustrated in FIG. 2D, the shift gradient α is obtained from Equation (1) when the first data of the measurement data for 1 second is denoted by $RFV_{0s}$ and the final data is denoted by $RFV_{1s}$.

$$\alpha = (RFV_{1s} - RFV_{0s})/1 \quad (1)$$

The correction value of RFV(t) is expressed as Equation (2) by using the shift gradient α obtained in Equation (1). Here, t indicates time information of measurement data.

$$RFV'(t) = RFV(t) - \alpha t \quad (2)$$

When Equation (2) is applied to FIG. 2D, FIG. 2F is obtained. In the RFV waveform illustrated in FIG. 2F, the first-order harmonic component or the peak to peak of the RFV waveform may be highly precisely obtained by eliminating the influence of the shift.

In summary, according to the tire uniformity testing device 101 of this embodiment, in a case where the drum mechanism 106 rotates the tire T1 in the reverse direction, the drum 105 is caused to retreat while the contact state between the drum and the tire T1 is maintained, the rotation of the tire T1 is switched from the rotation in one direction to the rotation in the other direction, and the drum 105 is caused to advance so that a load is applied to the tire T1. Then, the RFV waveform is corrected so as to eliminate the shift gradient α existing in the RFV waveform measured after the drum mechanism 106 reverses the rotation of the tire T1, and the RFV is obtained from the corrected RFV waveform. Accordingly, it is possible to highly precisely obtain the accurate uniformity of the tire T1, and particularly, the RFV from the measurement waveform immediately after the rotation direction of the tire is switched from the normal rotation direction to the reverse rotation direction.

Further, since the uniformity measurement may be performed in a state where the pressure of the tire T1 is not stabilized after the tire T1 is rotated reversely, the measurement time may be shortened, and the productivity may be improved.

[Second Embodiment]

Next, a second embodiment of the tire uniformity testing device and the tire uniformity testing method according to the present invention will be described with reference to the drawings.

The second embodiment is largely different from the first embodiment in that a second correction unit 110 is provided instead of the correction unit 109 of the first embodiment and the second correction unit 110 is configured to store the uniformity waveform from the time earlier than the uniformity waveform measurement start time and to correct the RFV waveform from the early time so that the shift gradient α' obtained from the RFV waveform is eliminated from the early time.

Furthermore, the other configurations are substantially the same as those of the first embodiment, and hence the description thereof will not be repeated.

As in the first embodiment, first, the drum position starts to retreat immediately before the rotation speed of the tire T1 is changed during the normal rotation of the tire T1, and the drum 105 is caused to retreat at the same time when the rotation speed is decreased. The drum load is decreased as the drum is caused to retreat. Subsequently, the drum position is controlled so that the drum load becomes minimal at the timing in which the rotation speed of the tire T1 becomes 0, that is the rotation of the drum 105 stops. At this time, the tire T1 starts to be rotated reversely at the drum position, the drum 105 is caused to gradually advance when the tire T1 is accelerated in the reverse rotation direction, and the drum 105 is caused to reach a predetermined test position at the timing in which the rotation speed of the tire T1 becomes a predetermined test rotation speed. Further, the tire T1 is rotated reversely, and the uniformity waveform is measured during the reverse rotation.

At this time, in the second correction unit 110, the data is stored from the timing (−βs) earlier than the specific RFV measurement data (0 sec of FIG. 2D), and the first waveform data is set as $RFV_{-\beta s}$. That is, an inequation of $-1 \leq \beta < 0$ is established. When the data of (1−β)s in the RFV measurement range is set as $RFV_{(1-\beta)s}$, the shift gradient α' before the measurement range is calculated from Equation (3).

$$\alpha' = (RFV_{(1-\beta)s} - RFV_{-\beta s})/1 \quad (3)$$

Next, the shift gradient α calculated in Equation (1) is compared with the shift gradient α' calculated in Equation (3) by the second correction unit 10.

In a case where the gradient of the shift gradient α is equal to or smaller than ½ of the shift gradient α' as a result of the comparison, the shift correction is not performed on the data of $RFV_{0s}$ to $RFV_{1s}$, and the waveform correction is performed on the data of $RFV_{-\beta s}$ to $RFV_{(1-\beta)s}$ based on the shift gradient α'.

In this way, even when the shift gradient α largely changes in the data range (after 0 sec) and the measurement precision is degraded by the shift gradient correction calculation of the correction unit 9 of the first embodiment, it is possible to highly precisely obtain the uniformity of the tire T1, and particularly, the RFV by performing the shift gradient correction on the data from the early time (before 0 sec) as in the second embodiment. Further, since the uniformity measurement may be performed in a state where the tire pressure is not stabilized after the tire T1 is rotated reversely, the measurement time may be shortened, and the productivity may be improved.

Furthermore, the embodiment disclosed herein is merely an example in every respect, and does not limit the present invention. For example, the shift gradient α existing in the RFV waveform may be corrected based on the gradient of the internal pressure variation waveform (FIG. 2E) of the tire T when the tire T1 is rotated reversely.

[Third Embodiment]

A tire uniformity testing device 201 and a tire uniformity testing method according to the present invention will be described with reference to the drawings.

As illustrated in FIG. 5, the tire uniformity testing device 201 evaluates the tire uniformity characteristic of the product tire T2, and particularly, a variation in force of the tire radial direction (Radial Force Variation: RFV) as the production test.

Specifically, the tire uniformity testing device 201 includes a cylindrical frame body 202 that is disposed so that the axis center thereof faces the vertical direction and a spindle shaft 203 that is attached into the frame body 202 so as to be rotatable about the vertical axis through a bearing portion (not illustrated). The spindle shaft 203 protrudes upward from the upper end of the frame body 202, and a pair of upper and lower rims 204 is provided at the upward protruding portion of the spindle shaft 203 so as to fix the tire T2. Further, a substantially cylindrical drum (load drum) 205 having a simulation road surface 206a formed on the outer peripheral surface thereof is provided beside the tire T2 fixed by the rims 204. The drum 205 is provided in a drum mechanism 206.

Furthermore, in the description of the specification, the vertical direction of the drawing sheet of FIG. 5 is set as the vertical direction of the tire uniformity testing device.

The drum mechanism 206 of this embodiment is adapted to support the drum 205 so that the drum may be driven and rotated about the vertical axis and to move horizontally so that the simulation road surface 206a contacts the tire T2. In a case where the drum mechanism 206 reverses the rotation of the tire T2, the drum 205 is caused to retreat while the contact state between the drum and the tire T2 is maintained, the rotation direction of the tire T2 is switched from the rotation in one direction (the normal rotation direction) to the rotation in the other direction (the reverse rotation direction), and the drum 205 is caused to advance so that a load is applied to the tire T2.

As illustrated in FIG. 5, there is a need to adjust the pressure of the tire T2 to a predetermined air pressure in order to perform a tire test. Therefore, an air pressure circuit 207, which adjusts the air pressure inside the tire T2 by supplying compressed air generated from an air supply 209 into the tire T2 or discharging compressed air from the inside of the tire T2 to the atmosphere or the like, is disposed in the tire uniformity testing device 201.

Specifically, as illustrated in FIG. 6, the air pressure circuit 207 includes two supply pipe systems. One supply pipe system is a pipe of a bead seat system 210 that inflates the tire T2 in a short time and attaches the tire T2 to the rims 204, and the other supply pipe system is a pipe of a test system 211 that is used to test the tire T2.

The air pressure of the compressed air that is circulated through the bead seat system 210 is adjusted to an air pressure (bead pressure) of about 0.4 MPa, and the air pressure of the compressed air that is circulated through the test system 211 is adjusted to an air pressure (test pressure) of about 0.2 MPa lower than that of the bead seat system 210. As for the bead seat system 210 and the test system 211, the air passage is branched in the course from the air supply 209 to the tire T2, the respective air pressures of the air passages are adjusted, and the air passages are joined to one pipe again. The pipe of the bead seat system 210 and the pipe of the test system 211 may be switched by using a switch valve.

In the pipe path of the test system 211, the air supply 209, a pressure adjustment valve (hereinafter, also referred to as a test pressure adjustment valve 213), a plumbing valve 214, a switch valve 215, and a pressure detection unit 217 are sequentially disposed from the upstream side (the side near the air supply 209) toward the downstream side. Further, in the pipe path of the bead seat system 210, the pipe is branched from the pipe of the test system 211 at the downstream side of the air supply 209, the air pressure is adjusted to a bead pressure by a different pressure adjustment valve (hereinafter, referred to as a bead pressure adjustment valve 12), and the pipe is joined to the pipe of the test system 211 at the switch valve 215. Then, the pipe paths for the bead seat system 210 and the test system 211 is provided with an isolation valve 216 that constitutes an air-outflow regulation member 220 to be described later.

The air supply 209 is connected to an air compressor (not illustrated) or an air supply of a factory, and generates compressed air having a pressure equal to or higher than the air pressure used to inflate the tire T2 through the bead seat system 210. An air filter 218 that captures dust or the like flowing from the air supply 209 is provided at the downstream side thereof, and a pressure meter 219 that checks the pressure of the compressed air generated by the air supply 209 is provided at the downstream side of the air filter 218.

A bead pressure adjustment valve 212 provided in the bead seat system 210 and the test pressure adjustment valve 213 provided in the test system 211 are both pressure regulators that adjust the pressure of the compressed an supplied from the an supply 209 to a predetermined pressure. As the pressure adjustment valves 212 and 213, internal pilot-type depressurization valves with a relief function are used, and the pressure of the compressed air generated by the air supply 209 may be adjusted to be depressurized to the bead pressure (for example, 0.4 MPa) or the test pressure for example, 0.2 MPa).

The plumbing valve 214 is a direction control valve (a direction control valve of which the pilot pressure is controlled electromagnetically) that is provided at the downstream side of the test pressure adjustment valve 213 provided in the test system 211, and controls the operation of supplying air to the tire T2 before the start of the tire test and the operation of discharging air from the tire T2 (to the atmosphere) after the end of the tire test by the switching of the valve.

The switch valve 215 is used to switch the compressed air passage to the test system 211 or the bead seat system 210, and is used to switch the air pressure inside the tire T2 to the bead pressure or the test pressure. The switch valve 215 is configured as a direction control valve of which the pilot pressure is controlled electromagnetically.

The pressure detection unit 217 includes an air pressure sensor that is provided at the downstream side of the plumbing valve 214, and detects the air pressure exerted inside the tire T2.

Incidentally, in a case where the above-described drum mechanism 206 reverses the rotation of the tire T2, the drum 205 is caused to retreat while the contact state between the drum and the tire T2 is maintained, the rotation direction of the tire T2 is switched from the normal rotation direction to the reverse rotation direction, the drum 205 is caused to advance so that a load is applied to the tire T2. In this way, when the drum 205 retreats and advances, it is possible to prevent the "state where the remaining recessed portion is formed in the surface of the tire T2" as mentioned in Patent Document 4. However, when the rotation direction of the tire T2 is switched, the load that is applied from the drum 205 to the tire T2 changes, and hence the volume (inner volume) inside the tire T also changes.

For example, when the drum 205 is caused to retreat from the tire T2 before the rotation direction is reversed, the inner volume inside the tire T2 increases, and hence the pressure inside the tire T2 decreases. Thus, when the internal pressure of the tire T2 is changed to the test pressure by the function of the test pressure adjustment valve 213, the compressed air is supplied into the tire T2. Subsequently, when the drum 205 is caused to advance to the same position as that at the normal rotation state and a load is applied to the tire, the inner volume inside the tire T2 decreases, and hence the internal pressure of the tire T2 increases instantly.

That is, when the internal pressure of the tire T2 instantly changes with the reverse rotation of the rotation direction, an unnecessary pressure adjustment is performed by the test pressure adjustment valve 213 so that the changed internal pressure of the tire T2 is stabilized. While the changed internal pressure is stabilized, the precision of the tire uniformity test may not be ensured.

Therefore, the air pressure circuit 207 of the tire uniformity testing device 201 of the present invention is provided with the air-outflow regulation member 220 that regulates the compressed air from flowing into the tire T2 when the drum 205 is caused to retreat by the drum mechanism 206 and cancels the regulation of the inflow of the compressed air after the drum is caused to advance by the drum mechanism 206. Specifically, the air-outflow regulation member 220 is configured as the isolation valve 216 that is disposed between the pressure adjustment valve and the tire T2 and interrupts the supply of the compressed air from the pressure adjustment valve toward the tire T2.

In this embodiment, the isolation valve 216 is provided in the pipe from the switch valve 215 to the tire T2 (the downstream side of the switch valve 215), that is, the pipe to which the pipe path of the bead seat system and the pipe path of the test system are joined. The isolation valve 216 is a direction control valve, and may isolate the compressed air passage by switching the valve so that the compressed air is enclosed inside the pipe reaching the inside of the tire T2 at the downstream side of the isolation valve 216. That is, one pipe that may be switched by the isolation valve 216 is connected to the air supply 209, but the other pipe is sealed by an end plug. Then, when the sealed pipe is selected, the compressed air may be enclosed inside the tire T2 and the pipe from the isolation valve 216 to the tire T2.

If the inflow of the air is regulated by providing such an air-outflow regulation member 220 (the isolation valve 216), even when the pressure adjustment valve 213 is operated with the retreat or the advance of the drum, the volume or the pressure inside the tire T2 is not influenced at all. That is, when the drum 205 is caused to retreat, the volume inside the tire T2 increases, and hence the internal pressure of the tire T2 decreases. Accordingly, the pressure adjustment valve 213 tries to supply the compressed air into the tire T2. Incidentally, since the isolation valve 216 regulates the supply of the compressed air from the air supply 209 to the inside of the tire, no air is supplied into the tire even when the pressure adjustment valve 213 is operated. Further, when the drum 205 advances, the pressure adjustment valve 213 tries to discharge the compressed air from the inside of the tire T2 differently from the case where the drum retreats. However, since the isolation valve 216 regulates the supply of the compressed air from the air supply 209 to the inside of the tire, no air is discharged from the inside of the tire. As a result, even when the drum 205 retreats or advances, the volume or the pressure of the compressed air inside the tire is uniformly maintained, and hence the tire uniformity may be accurately and efficiently measured without waiting for the stabilization of the tire internal pressure as in the related art.

In other words, the air-outflow regulation member 220 of the present invention shuts off (interrupts) the supply of the air from the air supply 209 so as to prevent the inflow or the outflow of the air inside the tire T only while the drum 205 retreats or advances, and hence the tire uniformity may be accurately measured immediately after the measurement during the reverse rotation.

Next, the procedure of measuring the tire uniformity using the tire uniformity testing device 201 of the present invention will be described.

First, in a case where the tire uniformity measurement is performed, the tire T2 that is conveyed from the upstream side of the inspection line is clamped between the upper and lower rims 204, and the tire T2 is inflated in a short time by using the pipe of the bead seat system 210 of the air pressure circuit 207. In this way, the tire T2 is inflated instantly so that the bead portion of the tire T2 is strongly fixed to the rims 204, and the air pressure inside the tire T2 is changed to the test pressure (for example 0.2 MPa). Then, the drum 205 is pressed against the tire T2 so that the "tire is rotated normally", and the repelling force generated in the tire T2 is measured by using the load detector (load cell) or the like, thereby measuring the RFV waveform during the normal rotation of the tire T2.

In this way, after the measurement of the RFV waveform during the normal rotation ends, the tire T2 is rotated reversely, and the RFV waveform during the "reverse rotation" is measured.

First, the drum position starts to retreat immediately before the rotation speed of the tire T2 is changed (decreased) during the normal rotation of the tire (at the late time of the measurement of the RFV waveform during the normal rotation), and the drum 205 is caused to further retreat while the rotation speed of the tire is decreased. At the time in which the drum 205 starts to retreat, the isolation valve 216 (the air-outflow regulation member 220) is operated so that the pipe of the downstream side of the isolation valve 216 and the inside of the tire T2 are interrupted from the upstream side (the air supply 209) of the isolation valve 216.

Meanwhile, the drum load (load) generated by the drum 205 decreases as the drum retreats. It is preferable to set the retreat amount of the drum 205 as the amount in which the drum load remains in a degree that no slip occurs between the tire T2 and the drum 205. This is because the rotation of the drum 205 may be transmitted from the motor driven spindle shaft 203 to the drum 205 through the tire T2, and hence there is a possibility that the tire T2 may slip due to the inertia force generated when the rotation of the drum is accelerated or decelerated if the contact pressure between the tire T2 and the drum 205 is small.

Subsequently, the drum position is controlled so that the drum load becomes minimal at the timing in which the rotation speed of the tire T2 becomes 0, that is, the rotation of the drum 205 stops. At this time, the rotation direction of the tire T2 is reversed at the drum position. the drum 205 is caused to gradually advance as the rotation speed of the tire T2 increases (accelerated) in the reverse rotation direction, and the drum 205 is caused to reach a predetermined test position at the timing in which the rotation speed of the tire T2 becomes a predetermined test rotation speed. Further, the regulation (interruption) using the isolation valve 216 (the air-outflow regulation member 220) is canceled, the tire T2 is rotated reversely after the cancellation, and the uniformity waveform during the reverse rotation is measured.

In this way, when the air-outflow regulation member 220 is operated in accordance with the retreat and the advance of the drum 205, the inflow or the outflow of the compressed air with respect to the inside of the tire T2 is regulated only while the drum 205 retreats and advances, and hence the inside of the tire T2 from the air supply 209 or the pressure adjustment valve 213 is maintained in a sealed state. That is since the drum 205 is maintained at the state before the retreat by the air-outflow regulation member 220, when the regulation using the air-outflow regulation member 220 is canceled, the tire uniformity may be accurately measured immediately after the measurement during the reverse rotation.

Next, the effect of the case of using the tire uniformity testing device 201 of the present invention will be described with reference to specific examples.

Figure 7D:
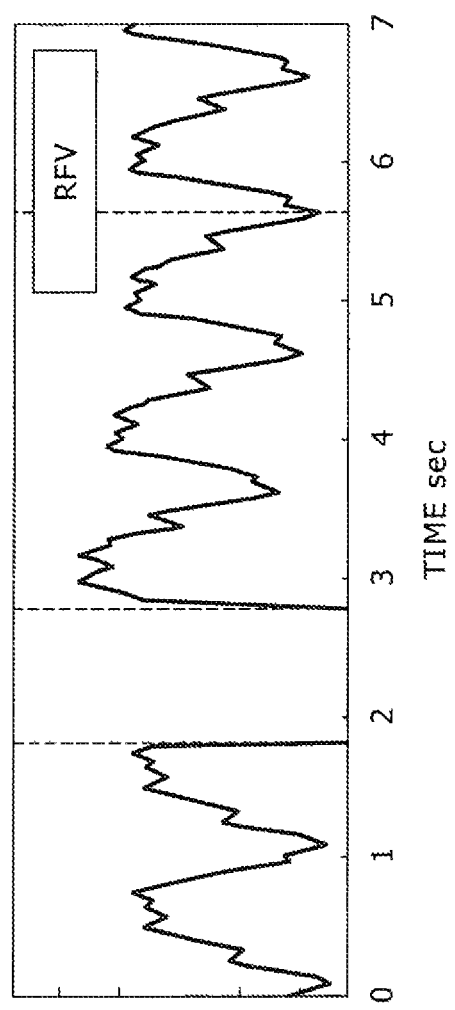
FIG. 7D is a diagram illustrating a variation in RFV waveform from a normal rotation to a reverse rotation of a tire (in a case without an air-outflow regulation member).
Figure 7F:
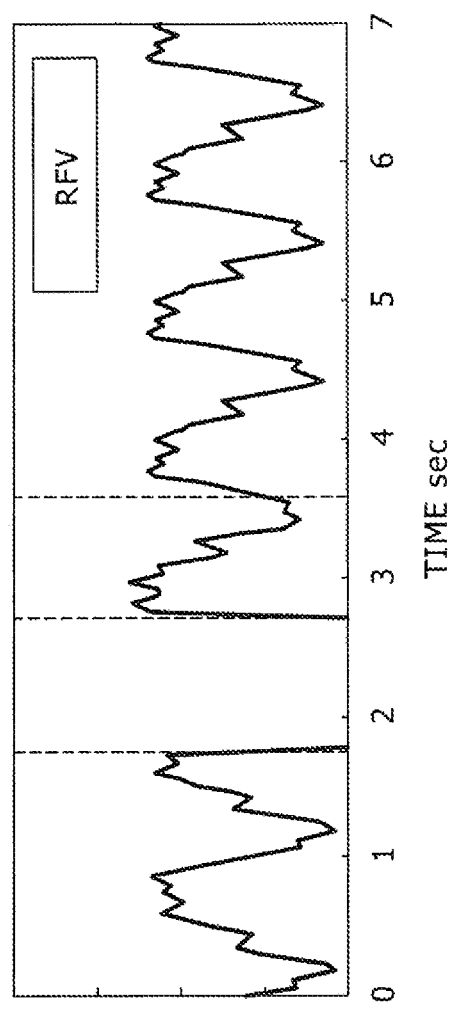
FIG. 7F is a diagram illustrating a variation in RFV waveform from a normal rotation to a reverse rotation of a tire (in a case with the air-outflow regulation member).

FIGS. 7A to 7G illustrate a variation in rotation speed of the tire T2, a variation in drum position, a variation in drum load, a variation in RFV waveform of the related art, a variation in RFV waveform of the present invention, and a variation in internal pressure of the tire T2 when the rotation direction of the tire T2 is switched from the normal rotation direction to the reverse rotation. The RFV waveforms of FIGS. 7D and 7F are measured by a uniformity measurement unit 208.

In a case where the air-outflow regulation member 220 is not provided, when the drum 205 is caused to retreat or advance during the reverse rotation of the tire T2, the internal pressure of the tire T2 first decreases and largely increases when the drum 205 advances (for 2.5 to 3 sec as the measurement time) as illustrated in FIG. 7E. Subsequently; the internal pressure of the tire T2 almost linearly decreases until the internal pressure returns to the predetermined test pressure (for 3 to 5 sec as the measurement time). In the meantime, as illustrated in FIG. 7D, the RFV waveform is also shifted upward or downward with a certain gradient. In this way, when the shifted RFV waveform is used, it is difficult to obtain the correct RFV and the obtained RFV also includes an error.

Figure 7G:
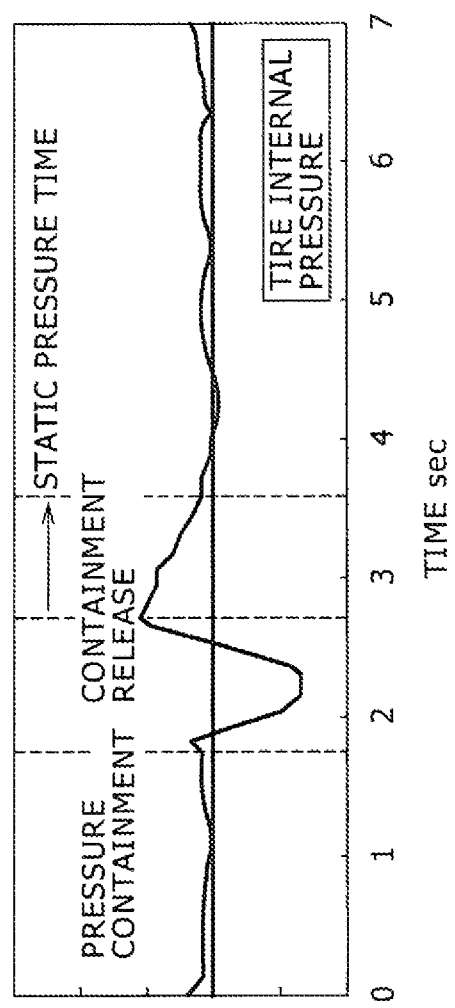
FIG. 7G is a diagram illustrating a variation in tire internal pressure from a normal rotation to a reverse rotation of a tire (in a case with the air-outflow regulation member).

Meanwhile, in a case where the air-outflow regulation member 220 is used, when the drum 205 is caused to retreat or advance during the reverse rotation of the tire T2, the internal pressure of the tire T2 becomes substantially uniform before the retreat of the drum 205 or after the advance of the drum as illustrated in FIG. 7G. Thus, as illustrated in FIG. 7F, even when the RFV waveform is measured immediately after the drum advances completely, it is possible to obtain the accurate RFV data immediately after the tire T2 is rotated reversely without any shift.

In this way, when the air-outflow regulation member 220 of the present invention is used, the pressure of the tire T2 may be maintained at the test pressure immediately after the tire T2 is rotated reversely. Accordingly, it is possible to obtain the accurate uniformity waveform and the accurate uniformity measurement value at all times. Thus, it is possible to shorten the measurement time and to improve the productivity.

Furthermore, in a case where the tire T is separated after the tire test is performed, the plumbing valve 214 that is provided in the pipe of the test system 211 is operated, the compressed air inside the tire T2 is discharged to the atmosphere, and then the attachment of the next tire T2 is prepared.

[Fourth Embodiment]

Next, the tire uniformity testing device 201 according to a fourth embodiment will be described.

Figure 8:
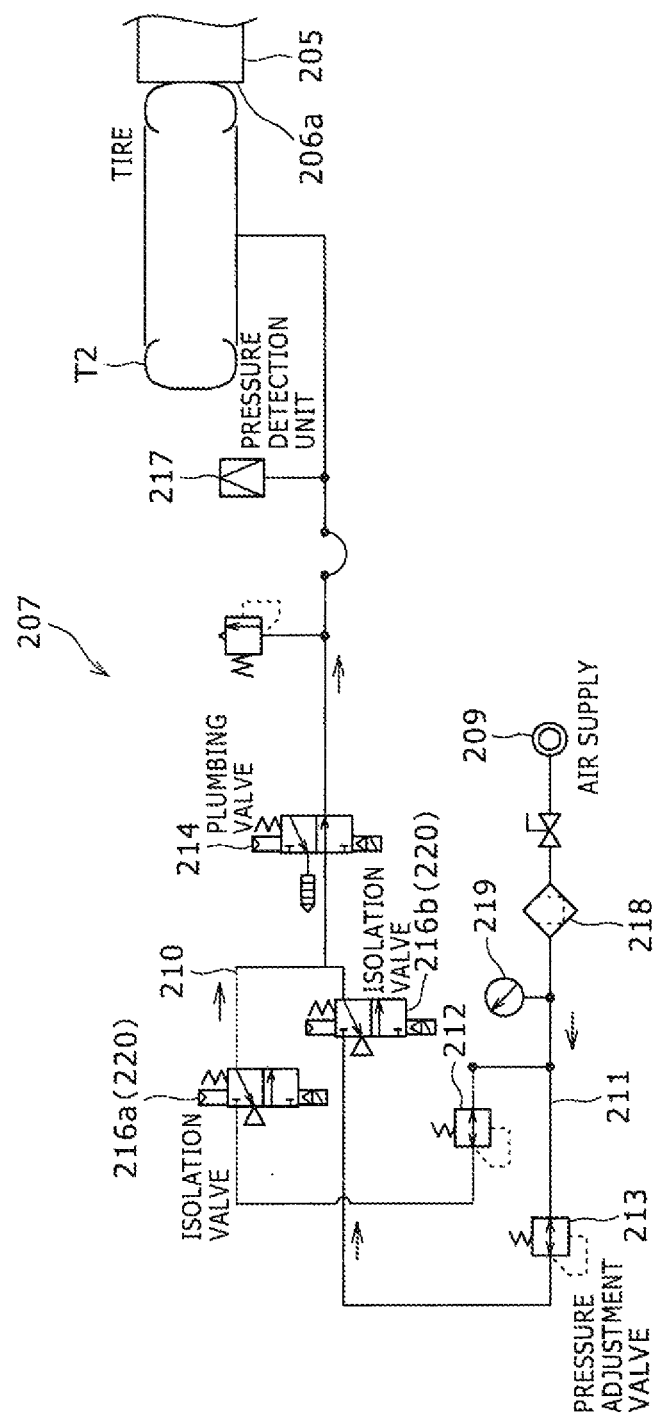
FIG. 8 is a diagram illustrating an air pressure circuit of a fourth embodiment.

As illustrated in FIG. 8, in the tire uniformity testing device 201 of the fourth embodiment, isolation valves 216a and 216b are provided in the pipe at the upstream side of the plumbing valve 214, that is, the pipe path of the bead seat system 210 and the pipe path of the test system 211. These isolation valves 216a and 216b are both direction control valves. When any one valve is opened and the other valve is closed, the air passage may be switched to the bead seat system 210 or the test system 211. Then, when two valves are closed at the same timing, the compressed air passages passing through two pipe paths are completely closed, and hence the compressed air may be enclosed in the pipe that extends from the isolation valves 216a and 216b to the inside of the downstream tire T2 through the plumbing valve 214.

Even when such an air-outflow regulation member 220 is used, the tire uniformity measurement precision may be improved and the measurement time may be shortened. Accordingly, the productivity may be improved.

Furthermore, in the embodiments disclosed herein, the contents that are not disclosed explicitly, for example, the running condition, the operation condition, various parameters, the dimension, the weight, and the volume of the constituent, and the like are set to the values which may be easily supposed by the general person skilled in the art without departing from the general scope of the art.

EXPLANATION OF REFERENCE NUMERALS 101 tire uniformity testing device
102 frame body
103 spindle shaft
104 rim
105 drum
106 drum mechanism
106a simulation road surface
107 air pressure circuit
108 uniformity measurement unit
109 first correction unit
110 second correction unit
T1 tire
201 tire uniformity testing device
202 frame body
203 spindle shaft
204 rim
205 drum
206 drum mechanism
206a simulation road surface
207 air pressure circuit
208 uniformity measurement unit
209 air supply
210 bead seat system
211 test system
212 bead pressure adjustment valve
213 test pressure adjustment valve
214 plumbing valve
215 switch valve
216 isolation valve
216a isolation valve of bead seat system
216b isolation valve of test system
217 pressure detection unit
218 air filter
219 pressure meter
220 air-outflow regulation member
T2 tire

The invention claimed is:

1. A tire uniformity testing device comprising:
a spindle shaft to which a tire is attachable; and
a drum mechanism that rotatably supports a drum and presses the tire attached to the spindle shaft against an outer peripheral surface of the drum,
wherein in a case where the drum mechanism reverses the rotation of the tire, the drum is caused to retreat while the contact state between the drum and the tire is maintained, the rotation direction of the tire is switched from the rotation in one direction to the rotation in the other direction, and the drum is caused to advance so that a load is applied to the tire, wherein the tire uniformity testing device further comprises:
a correction unit that corrects a uniformity waveform so as to eliminate a shift gradient a existing in the uniformity waveform measured after the drum mechanism reverses the rotation of the tire; and
a measurement unit that obtains a force variation from the uniformity waveform corrected by the correction unit.

2. The tire uniformity testing device according to claim 1, further comprising:
a second correction unit that is provided instead of the correction unit,
wherein the second correction unit is configured to store the uniformity waveform from the time earlier than the uniformity waveform measurement start time and to correct the uniformity waveform from the early time so as to eliminate a shift gradient a.' obtained from the uniformity waveform from the early time.

3. A tire uniformity testing method of a tire uniformity testing device including a spindle shaft to which a tire is attachable and a drum mechanism that presses a rotatable drum against the outer periphery of the tire,
wherein in a case where the drum mechanism reverses the rotation of the tire, the drum is caused to retreat while the contact state between the drum and the tire is maintained, the rotation direction of the tire is switched from the rotation in one direction to the rotation in the other direction, and the drum is caused to advance so that a load is applied to the tire,
wherein a uniformity waveform is corrected so as to eliminate a shift gradient a. existing in a uniformity waveform measured after the drum mechanism reverses the rotation of the tire, and
wherein a force variation is obtained from the corrected uniformity waveform.

4. The tire uniformity testing method according to claim 3,
wherein the uniformity waveform is stored from the time earlier than the uniformity waveform measurement start time, and
wherein the uniformity waveform is corrected from the early time so as to eliminate a shift gradient a' obtained from the uniformity waveform at the early time instead of the correction of the uniformity waveform that eliminates the shift gradient a.

5. A tire uniformity testing device comprising:
a drum mechanism that rotatably supports a drum and presses the drum against an outer peripheral surface of a tire attached to a spindle shaft; and
an air pressure circuit that supplies compressed air to the tire,
wherein in a case where the drum mechanism reverses the rotation of the tire, the drum is caused to retreat while the contact state between the drum and the tire is maintained, the rotation direction of the tire is switched from the rotation in one direction to the rotation in the other direction, and the drum is caused to advance so that a load is applied to the tire, and
wherein the air pressure circuit includes an air-outflow regulation member that regulates the inflow of air into the tire when the drum mechanism causes the drum to retreat and cancels the regulation of the inflow of the air after the drum mechanism causes the drum to advance.

6. The tire uniformity testing device according to claim 5,
wherein the air pressure circuit includes an air supply that supplies the compressed air to the tire, a pressure detection unit that detects an air pressure exerted inside the tire, and a pressure adjustment valve that adjusts the pressure of the compressed air supplied from the air supply to a predetermined air pressure based on the air pressure detected by the pressure detection unit, and
wherein the air-outflow regulation member includes an isolation valve that is disposed between the pressure adjustment valve and the tire and interrupts the supply of the compressed air from the pressure adjustment valve to the tire.

7. The tire uniformity testing device according to claim 5,
wherein the air pressure circuit includes a plurality of branch pipes that are disposed in parallel between the air supply and the tire, and
wherein each branch pipe is provided with the pressure adjustment valve and an isolation valve that interrupts the supply of the compressed air from the pressure adjustment valve to the tire.

8. A tire uniformity testing device according to claim 5
wherein the air pressure circuit includes a plurality of branch pipes that are disposed in parallel between the air supply and the tire, and
wherein each branch pipe is provided with the pressure adjustment valve and an isolation valve that interrupts the supply of the compressed air from the pressure adjustments valve to the tire.

9. A tire uniformity testing method that uses a tire uniformity testing device including a drum mechanism that rotatably supports a drum and presses the drum against an outer peripheral surface of a tire attached to a spindle shaft and an air pressure circuit that supplies compressed air to the tire,
wherein in a case where the drum mechanism reverses the rotation of the tire, the drum is caused to retreat while the contact state between the drum and the tire is maintained, the rotation direction of the tire is switched from the rotation in one direction to the rotation in the other direction, and the drum is caused to advance so that a load is applied to the tire, and
wherein in a case where the rotation of the tire is reversed from the rotation in one direction to the rotation in the other direction, the inflow of the compressed air into the tire through the air pressure circuit is regulated as the drum retreats, and the regulation of the inflow of the compressed air into the tire is canceled after the drum advances.

* * * * *